United States Patent
Chang

(10) Patent No.: US 8,417,753 B2
(45) Date of Patent: Apr. 9, 2013

(54) PIPELINED FFT CIRCUIT AND TRANSFORM METHOD THEREOF

(75) Inventor: Yun-Nan Chang, Fongshan (TW)

(73) Assignee: National Sun Yat-Sen University, Kaohsiung (TW)

( * ) Notice: Subject to any disclaimer, the term of this patent is extended or adjusted under 35 U.S.C. 154(b) by 995 days.

(21) Appl. No.: 12/468,584

(22) Filed: May 19, 2009

(65) Prior Publication Data

US 2010/0299383 A1 Nov. 25, 2010

(51) Int. Cl.
G06F 17/14 (2006.01)
G06F 15/00 (2006.01)

(52) U.S. Cl. .................... 708/404; 708/406; 708/409

(58) Field of Classification Search .......... 708/404, 708/406, 409
See application file for complete search history.

(56) References Cited

U.S. PATENT DOCUMENTS 4,868,776 A * 9/1989 Gray et al. .................... 708/405
5,293,330 A * 3/1994 Sayegh .......................... 708/406

OTHER PUBLICATIONS

Takala et al., Scalable FFT Processors and Pipelined Butterfly Units, Journal of VLSI Signal Processing 43, 113-123, 2006.*
Chang, Yun-Nan, "An Efficeint VLSI Architecture for Normal I/O Order Pipeline FFT Design," IEEE Transactions on Circuits and Systems—II Express Briefs, Dec. 2008, vol. 55, No. 12.

* cited by examiner

Primary Examiner — James Trujillo
Assistant Examiner — William Spieler
(74) Attorney, Agent, or Firm — Muncy, Geissler, Olds & Lowe, PLLC

(57) ABSTRACT

A pipelined FFT circuit used for processing a sequential input data with a set of N samples comprises a data division unit, a data-preprocessing unit and M sets of data computation unit. The data division unit is used for dividing the sequential input data into a first input data stream and a second input data stream. The data-preprocessing unit receives the first and second input data streams and orders the first input data stream to an odd number-index data stream, the second input data stream to an even number-index data stream respectively. Each of the data computation units has a data switch and a butterfly computator connected with the data switch, where $M=\log_2 N$, the data switch of the first data computation unit is connected with the data-preprocessing unit.

9 Claims, 4 Drawing Sheets

| Stage | Stage 3 O/P | Converter I/P | Converter O/P | Butterfly Operation | Output Data |
|---|---|---|---|---|---|
| ... | ... | ... | ... | ... | ... |
| 17 | $0_L, 2_L$ | – | – | – | – |
| 18 | $0_H, 2_H$ | 0, – | – | – | – |
| 19 | $4_L, 6_L$ | 2, – | – | – | – |
| ... | ... | ... | ... | ... | ... |
| 23 | $12_L, 14_L$ | 10, – | – | – | – |
| 24 | $12_H, 14_H$ | 12, – | – | – | – |
| 25 | $1_L, 3_L$ | 14, – | – | – | – |
| 26 | $1_H, 3_H$ | 1, – | – | – | – |
| 27 | $5_L, 7_L$ | 3, – | – | – | – |
| ... | ... | ... | ... | ... | ... |
| 31 | $13_L, 15_L$ | 11, – | – | idle | – |
| 32 | $13_H, 15_H$ | 13, – | – | idle | – |
| 33 | $0^*_L, 2^*_L$ | 15, – | – | idle | – |
| 34 | $0^*_H, 2^*_H$ | $0^*, y8$ | 0, 1 | ✓ | y0 |
| 35 | $4^*_L, 6^*_L$ | $2^*, y9$ | 8, 9 | ✓ | y1 |
| 36 | $4^*_H, 6^*_H$ | $4^*, y10$ | 4, 5 | ✓ | y2 |
| 37 | $8^*_L, 10^*_L$ | $6^*, y11$ | 12, 13 | ✓ | y3 |
| 38 | $8^*_H, 10^*_H$ | $8^*, y12$ | 2, 3 | ✓ | y4 |
| 39 | $12^*_L, 14^*_L$ | $10^*, y13$ | 10, 11 | ✓ | y5 |
| 40 | $12^*_H, 14^*_H$ | $12^*, y14$ | 6, 7 | ✓ | y6 |
| 41 | $1^*_L, 3^*_L$ | $14^*, y15$ | 14, 15 | ✓ | y7 |
| 42 | $1^*_H, 3^*_H$ | $1^*, -$ | y8 | idle | y8 |
| 43 | $5^*_L, 7^*_L$ | $3^*, -$ | y9 | idle | y9 |
| 44 | $5^*_H, 7^*_H$ | $5^*, -$ | y10 | idle | y10 |

FIG. 4

PIPELINED FFT CIRCUIT AND TRANSFORM METHOD THEREOF

FIELD OF THE INVENTION

The present invention relates to a pipelined fast-Fourier transform (FFT) circuit able to increase utilization rate of computation unit and to lower hardware-designing cost and transform method thereof.

BACKGROUND OF THE INVENTION

FFT algorithm is frequently used to orthogonal frequency division multiplexing (OFDM) system and OFDM is widely applied to various communication systems in recent years, especially to wireless communication system, so that many communication-related researches on FFT processor have been developed substantially. FFT generally has two kinds of hardware design, one is non-pipelined and another is pipelined. Non-pipelined FFT, essentially adopting a main memory unit and a few butterfly computation processors, reads data out from main memory unit and processes them in order, in which computation of overall data at a same stage must be completed before performing computation of next stage. However, when non-pipelined method is applied to OFDM system, the data which is going to be processed needs to be pre-stored in memory and it is required to add an extra memory for temporarily storing new input data to enable parallel data input and processing able to process continuous input data. Compared to non-pipelined design, pipelined FFT design adapts for use in continuous single-input data system rather than non-pipelined design, the reason is that pipelined FFT design adds data switch composed of memory unit between process units of each stage to pre-order computation results of last stage to be suitable for data-processing sequence of next stage.

FIG. 1 shows a known Multi-Path Delay Feedback (MDF) type pipelined FFT, which can provide higher data throughput rate. However, because input data of the first half is prearranged and temporarily stored into memory in order to facilitate processing data at first stage, only 50% of hardware can be used for processing data and N/2 more internal buffer area is required to reset input data, that makes overall buffer area increase to total amount of $$W \times \frac{3N}{2},$$

where N represents sample number, W represents bit length of input data. Besides, overall output data obtained from computation of performing pipelined FFT are in special bit-reversal output sequence, so an extra output sequence converter is added to transform the bit-reversal output sequence of final stage to a general output sequence in applicable condition, but an extra cost is increased.

SUMMARY OF THE INVENTION

It is an object of the present invention to provide a pipelined FFT circuit used for processing a sequential input data with a set of N samples, which comprises a data division unit, a data-preprocessing unit and M sets of data computation unit. The data division unit is used for dividing the sequential input data into a first input data stream and a second input data stream. The data-preprocessing unit receives the first and second input data streams and orders the first input data stream to an odd number-index data stream, the second input data stream to an even number-index data stream respectively. Each of the data computation units has a data switch and a butterfly computator connected with the data switch, where $M=\log_2 N$, the data switch of the first data computation unit is connected with the data-preprocessing unit. According to the present invention, the sequential input data is divided into the first and second input data streams to perform subsequent M times of data computation, which can efficiently save computation capacity required by the data switchs and the butterfly computators about 50% as compared to original method, raise utilization rate of the data computation units close to 100% and reduce hardware design cost. Moreover, the output sequence transforming unit is integrated into the $M^{th}$ data computation unit according to the present invention, so that original internal memory capacity used by the output sequence transforming unit can be applied to output sequential data normally without adding extra memory module.

It is another object of the present invention to provide a pipelined FFT method used for processing sequential input data with a set of N samples, which comprises several steps described as follows. At the beginning, the sequential input data is divided into a first input data stream and a second input data stream, wherein data bit length of the first and second input data streams are half of data bit length of the sequential input data respectively. Next, the first and second input data streams are ordered to an odd number-index data stream and an even number-index data stream respectively. Finally, the odd and even number-index data streams are respectively performed M times of data computation, where $M=\log_2 N$, the data computation in each time comprises performing a data switching and a butterfly computation.

DESCRIPTION OF THE DRAWINGS

FIG. 4 is a table illustrating data processing schedule of output sequence transforming unit when N=16 according to a preferred embodiment of the present invention.

DETAILED DESCRIPTION OF THE INVENTION

Figure 1:
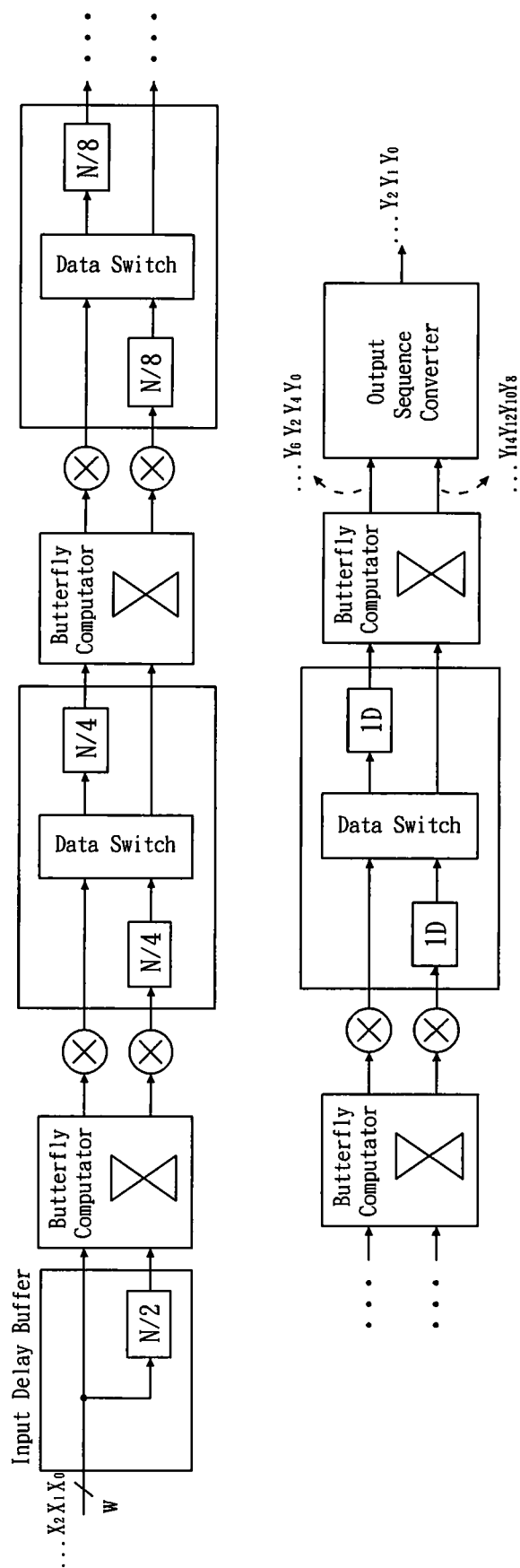
FIG. 1 illustrates known MDF type pipelined FFT circuit.
Figure 2:
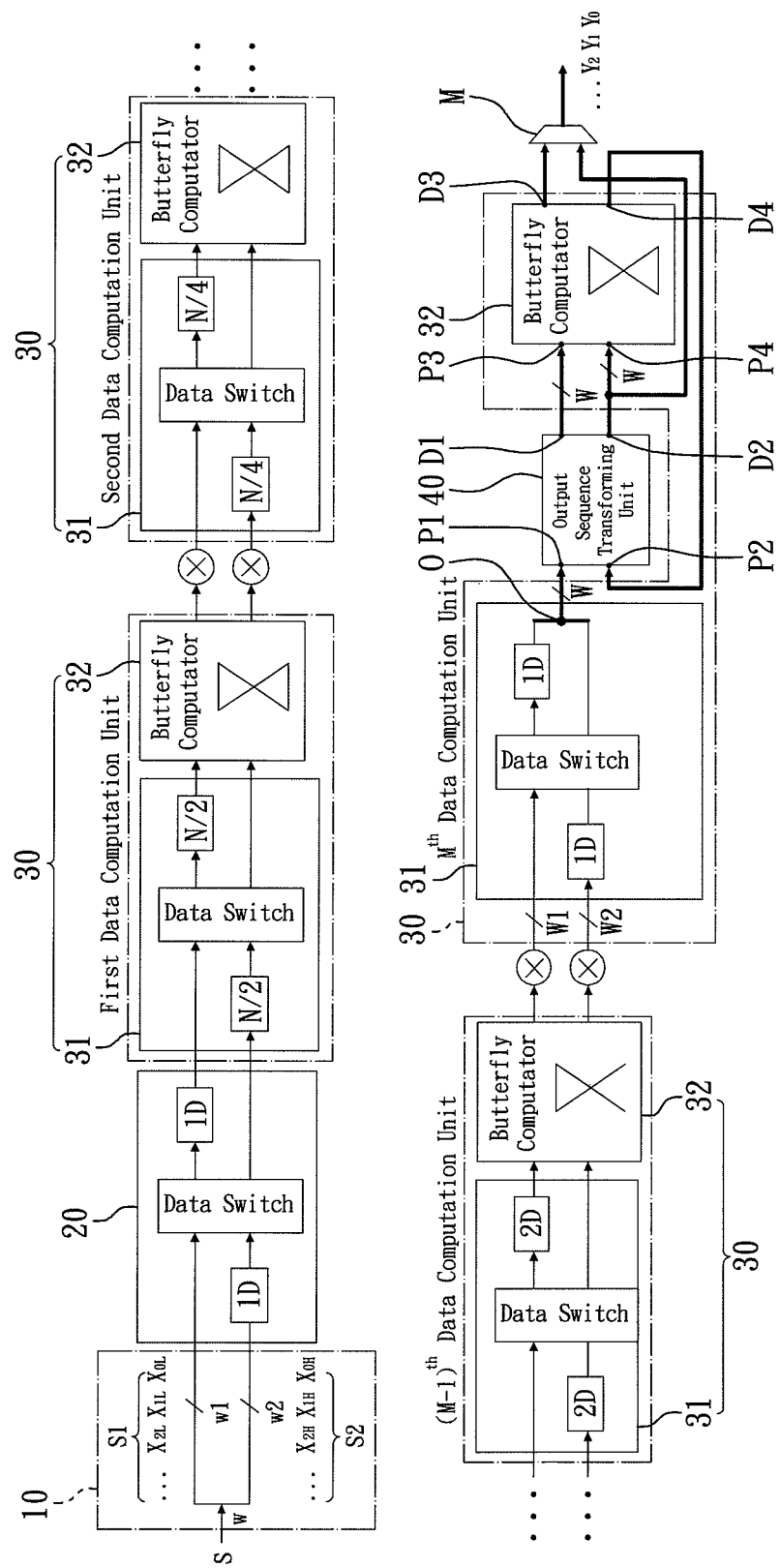
FIG. 2 illustrates a pipelined FFT circuit according to a preferred embodiment of the present invention.

With reference to FIG. 2, a pipelined FFT circuit according to a preferred embodiment of the present invention is used for processing a sequential input data S with a set of N samples, wherein N is two to the power. The pipelined FFT circuit comprises a data division unit 10, a data-preprocessing unit 20, M sets of data computation unit 30 and an output sequence transforming unit 40. The data division unit 10 is used for dividing the sequential input data S into a first input data stream S1 and a second input data stream S2, wherein the sequential input data S has a data bit length w, the first and second input data streams S1, S2 have a first data bit length w1 and a second data bit length w2 respectively, preferably, the first and second data bit lengths w1, w2 are respectively half of the data bit length w of the sequential input data S, i.e. w1=w2=w/2. The data-preprocessing unit 20 receives the first and second input data streams S1, S2 and orders the first input data stream S1 to an odd number-index data stream, the second input data stream S2 to an even number-index data stream respectively, indeed the data-preprocessing unit 20 is a data switch in this embodiment. Each of the data computation unit 30 has a data switch 31 and a butterfly computator 32 connected with the data switch 31, where M=log 2N, the data switch 31 of the first data computation unit 30 is connected with the data-preprocessing unit 20. Moreover, with reference again to FIG. 2, the output sequence transforming unit 40 is disposed between the data switch 31 of the $M^{th}$ data computation unit 30 and the butterfly computator 32 to directly generate output result in normal order via M times of data computation without adding extra temporary storage. Besides, the data switch 31 of the $M^{th}$ data computation unit 30 has a first terminal O, the output sequence transforming unit 40 has a first input end P1, a second input end P2, a second terminal D1 and a third terminal D2, wherein the first terminal O is connected with the first input end P1 of the output sequence transforming unit 40. Moreover, the butterfly computator 32 of the $M^{th}$ data computation unit 30 has a third input end P3, a fourth input end P4, an output terminal D3 and a fourth terminal D4, wherein the fourth terminal D4 is connected with the second input end P2 of the output sequence transforming unit 40, the second and third terminals D1, D2 of the output sequence transforming unit 40 are connected with the third and fourth input ends P3, P4, and the output terminal D3 is connected to a multiplexer M for outputting computation results.

Figure 3:
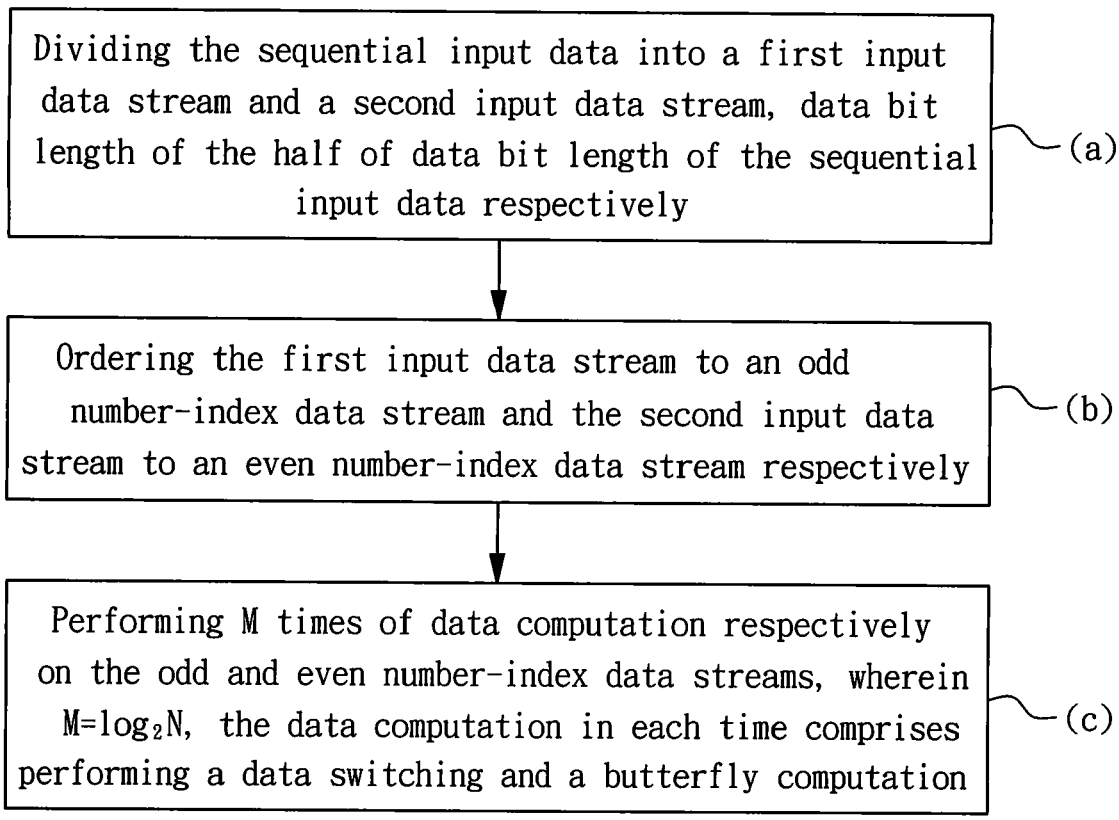
FIG. 3 is a flow chart of a pipelined FFT method according to a preferred embodiment of the present invention.

FIGS. 2 and 3 illustrates a pipelined FFT method according to the foregoing pipelined FFT circuit. At the beginning, with reference to step (a) of FIG. 3 and FIG. 2, the data division unit 10 is utilized to divide the sequential input data S into a first input data stream S1 and a second input data stream S2, wherein the sequential input data S has a data bit length w, the first and second input data streams S1, S2 have a first data bit length w1 and a second data bit length w2 respectively, preferably, the first and second data bit lengths w1, w2 are respectively half of the data bit length w of the sequential input data S, i.e. w1=w2=w/2. Next, with reference to step (b) of FIG. 3 and FIG. 2, the data-preprocessing unit 20 is utilized to order the first input data stream S1 to an odd number-index data stream and the second input data stream S2 to an even number-index data stream respectively. Finally, with reference to step (c) of FIG. 3 and FIG. 2, the data computation units 30 are respectively utilized to perform M times of data computation on the odd and even number-index data streams, where M=$log_2$N, the data computation in each time comprises performing a data switching and a butterfly computation. In this embodiment, after completing the first time data computation the even number-index data stream should be arranged in front of the odd number-index data stream to perform subsequent M−1 times of data computation. It further comprises a step of transforming output sequence after completing the $M^{th}$ time data switching, which comprises converging data streams with half character to form a data stream with whole character as well as performing butterfly computation on the data stream with whole character during the $M^{th}$ time data computation. In addition, there are two output results produced after butterfly computation, one is outputted normally and another is stored back to the buffer area of the output sequence transforming unit 40 waiting for output at a right output time. With reference to FIGS. 2 and 4, for example, $y_0$ and $y_8$ are computation results obtained via performing butterfly computation on 0, 1, $y_0$ is outputted and $y_8$ is stored back to the output sequence transforming unit 40, and so on, 8 points of data $y_0$ to $y_7$ included in the first half are outputted, and then $y_8$ to $y_{15}$ included in the second half are outputted in order via the output sequence transforming unit 40.

According to the present invention, the sequential input data S is divided into the first and second input data streams S1, S2 to perform subsequent M times of data computation, which can efficiently save computation capacity required by the data switchs 31 and the butterfly computators 32 about 50% compared to original method and raise utilization rate of the data computation units 30 close to 100% and reduce hardware design cost. Moreover, the output sequence transforming unit 40 is integrated with the $M^{th}$ data computation unit 30 according to the present invention, therefore original internal memory capacity used by the output sequence transforming unit 40 can be applied to output sequential data normally without adding extra memory module.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A pipelined FFT circuit used for processing a sequential input data with a set of N samples comprising:
   a data division unit used for dividing the sequential input data into a first input data stream and a second input data stream;
   a data-preprocessing unit receiving the first and second input data streams and ordering the first input data stream to an odd number-index data stream, the second input data stream to an even number-index data stream respectively;
   M sets of data computation unit, each of the data computation units having a data switch and a butterfly computator connected with the data switch, wherein M=$log_2$N, the data switch of the first data computation unit is connected with the data-preprocessing unit; and
   an output sequence transforming unit connected from the data switch of the $M^{th}$ data computation unit to the butterfly computator of the $M^{th}$ data computation unit, the output sequence transforming unit directly generating an output result in normal order via M times of data computation without extra temporary storage.

2. The pipelined FFT circuit in accordance with claim 1, wherein the data-preprocessing unit is a data switch.

3. The pipelined FFT circuit in accordance with claim 1, wherein the data switch of the $M^{th}$ data computation unit has a first terminal, the output sequence transforming unit has a first input end and a second input end, the first terminal of the data switch of the $M^{th}$ data computation unit is connected with the first input end of the output sequence transforming unit.

4. The pipelined FFT circuit in accordance with claim 3, wherein the output sequence transforming unit has a second terminal and a third terminal, the butterfly computator of the $M^{th}$ data computation unit has a third input end and a fourth input end, the second terminal is connected to the third input end, and the third terminal of the output sequence transforming unit is connected with the fourth input end of the butterfly computator of the $M^{th}$ data computation unit.

5. The pipelined FFT circuit in accordance with claim 4, wherein the butterfly computator of the $M^{th}$ data computation unit has an output terminal and a fourth terminal, the fourth terminal of the butterfly computator of the $M^{th}$ data computation unit is connected with the second input end of the output sequence transforming unit, and the output terminal is connected to a multiplexer for outputting computation results.

6. A pipelined FFT method used for processing a sequential input data with a set of N samples comprising the steps of:

providing a data division unit, a data-reprocessing unit and M sets of data computation units;

transforming the sequential input data into the data division unit and dividing the sequential input data into a first input data stream and a second input data stream via the data division unit, wherein data bit length of the first and second input data streams being half of data bit length of the sequential input data respectively;

transforming the first input data stream and the second input data stream from the data division unit to the data pre-processing unit and ordering the first input data stream to an odd number-index data stream and the second input data stream to an even number-index data stream respectively via the pre-processing unit; and transforming the odd number-index data stream and the even number-index data stream from the pre-processing unit to the M sets of data computation units and performing M times of data computation respectively on the odd and even number-index data streams, wherein $M=\log_2 N$, the data computation in each time comprises performing a data switching and a butterfly computation, wherein after completing the $M^{th}$ time data switching via a data switch of the $M^{th}$ data computation unit a step of transforming output sequence via an output sequence transforming unit of the $M^{th}$ data computation unit is performed for directly generating an output result in normal order via M times of data computation without extra temporary storage.

7. The pipelined FFT method in accordance with claim 6, wherein the even number-index data stream should be arranged in front of the odd number-index data stream after completing the first time data computation of the $1^{St}$ data computation unit.

8. The pipelined FFT method in accordance with claim 6, wherein the step of transforming output sequence comprises converging data streams with half word to form a data stream with full word.

9. The pipelined FFT method in accordance with claim 8, wherein it comprises performing butterfly computation of a butterfly computator of the $M^{th}$ data computation unit on the data stream with full word during the $M^{th}$ time data computation.

* * * * *